Inventors
J. S. Rasnick,
R. A. Buttery,
E. L. Lusk
By D. Swift
Attorney

Sept. 30, 1924.                                                       1,509,875
                          J. S. RASNICK ET AL
                          DUMP BODY BRACKET
                          Filed Jan. 8, 1924          2 Sheets-Sheet 2
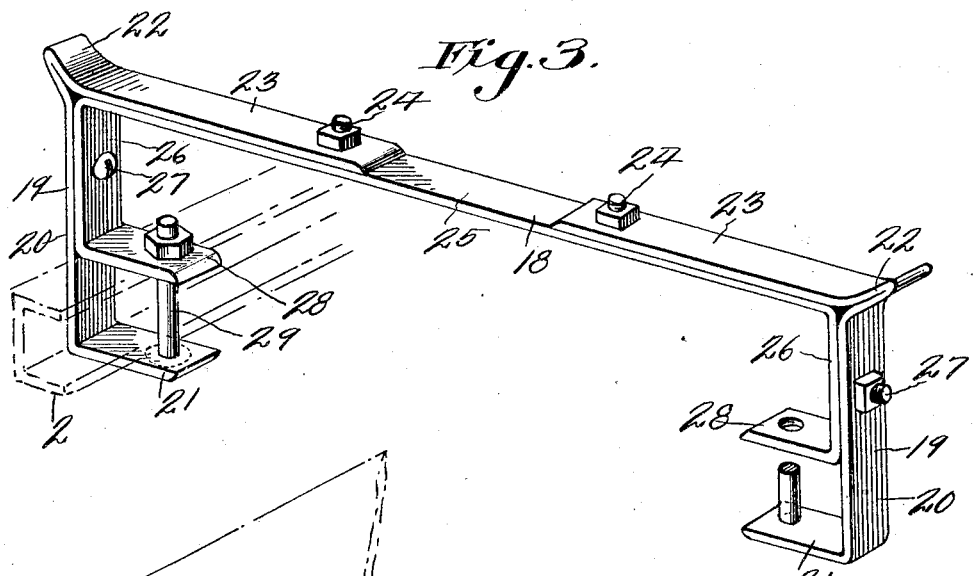
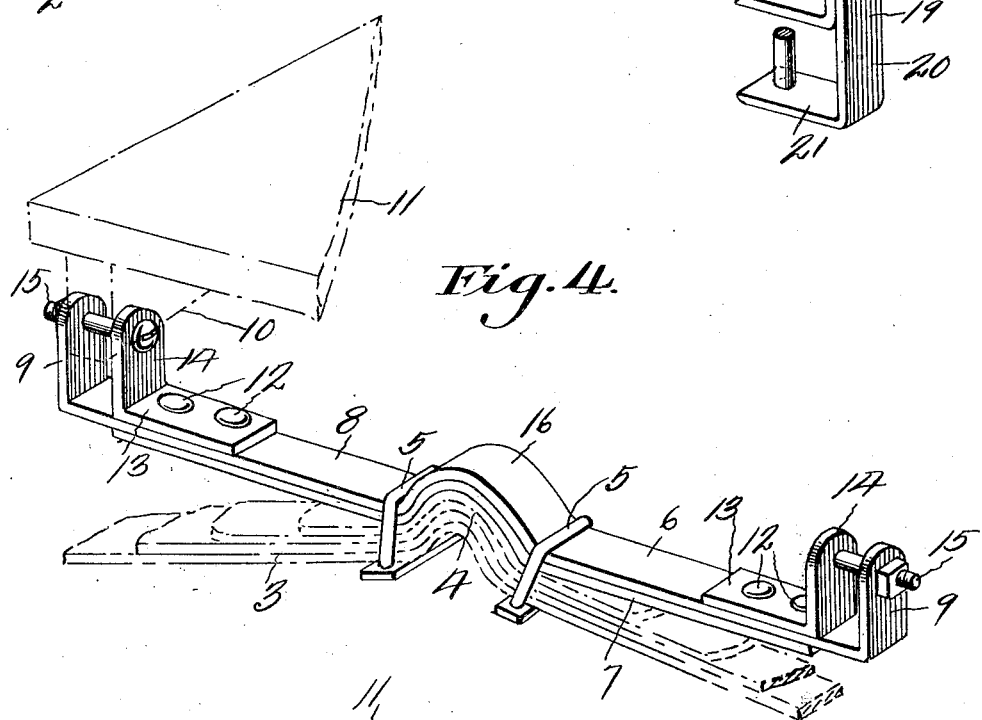
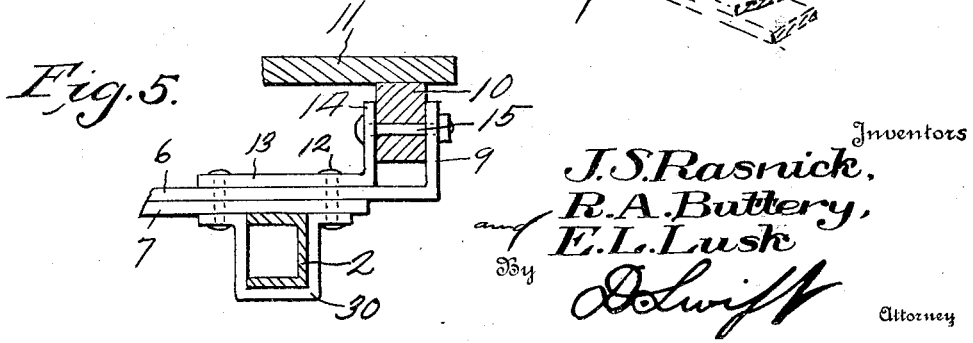
Inventors
J. S. Rasnick,
R. A. Buttery,
E. L. Lusk
By
Attorney Patented Sept. 30, 1924.

1,509,875

UNITED STATES PATENT OFFICE.

JOSEPH S. RASNICK, ROBERT A. BUTTERY, AND EWDARD L. LUSK, OF ST. PAUL, VIRGINIA.

DUMP-BODY BRACKET.

Application filed January 8, 1924. Serial No. 684,988.

*To all whom it may concern:*

Be it known that we, JOSEPH S. RASNICK, ROBERT A. BUTTERY, and EWDARD L. LUSK, citizens of the United States, residing at St. Paul, in the county of Wise, State of Virginia, have invented new and useful Dump-Body Brackets; and we do hereby declare the following to be a full, clear, and exact description of the invention, such as will enable others skilled in the art to which it appertains to make and use the same.

The invention relates to dump body brackets for motor driven vehicles, and has for its object to provide brackets which may be easily and quickly attached to the side rails of the chassis of an automobile for pivotally supporting a dump body thereon without modifying the construction of the chassis.

A further object is to provide a rear bracket provided with an upwardly extending segmentally shaped portion adapted to receive the similarly shaped portion of the rear spring of the vehicle and U-shaped clamping bolts on opposite sides of the semicircular shaped portion of the bracket for securely clamping the bracket to the spring. Also to provide the ends of the bracket with spaced ears between which ears the side rails of the dump body are pivoted, the inner ears being carried by removable plates.

A further object is to provide the chassis with a detachably mounted transverse bracket adjacent its forward end, said bracket having upturned ears for engaging the opposite sides of the dump body for preventing lateral movement of the forward end of the dump body as the vehicle goes over rough and uneven ground, thereby preventing twisting strain on the rear spring of the vehicle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 3 is a perspective view of the forward body supporting bracket.

Figure 4 is a perspective view of a rear body supporting bracket, showing the same attached to a spring.

Figure 5 is a detail sectional view transversely through one side of the dump body showing a modified form of rear bracket attached to the chassis.

Figure 1:
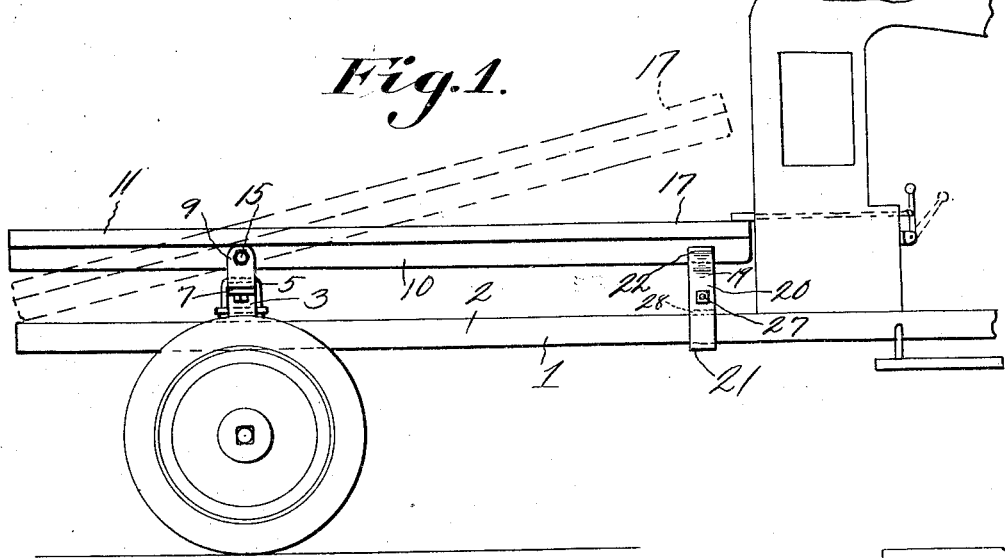
Figure 1 is a side elevation of a truck, showing the dump body and bracket applied thereto.
Figure 2:
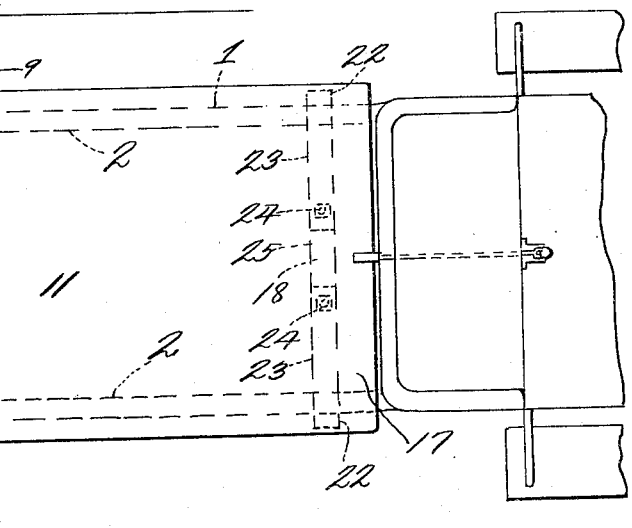
Figure 2 is a top plan view of the dump body and truck, part of the dump body being broken away to better show one of the pivotal points thereof.

Referring to the drawing, the numeral 1 designates the chassis of a conventional form of truck, and 2 the side rails thereof. The chassis is supported in the usual manner by the transversely disposed spring 3, which spring centrally thereof is provided with an upwardly extending arcuate portion 4 which is disposed above the differential of the truck. Secured to the upwardly extending portion 4 of the spring by means of U-bolts 5 is a transversely disposed bracket 6. Bracket 6 comprises engaging plates 7 and 8, said plate 7 forming means for bracing the upper plate 8. The outer ends of the plate 8 terminate in vertically disposed arms 9, which arms engage the outer sides of the longitudinally disposed bars 10 carried by the underside of the dump body 11. Secured to the bars 7 and 8, by means of bolts 12 are angularly shaped members 13, the arms 14 of which extend upwardly and are adapted to engage the inner sides of the bars 10 and to receive the pivot bolts 15 which extend through the arms 9 and 14 and through the bars 10 of the dump body, and on which pivot bolts the dump body as a whole tilts during a dumping operation. It will be seen that the bolt 12 and the clamping members 5 act to form a rigid structure for supporting the dump body and the upward bowed portion 16 of the bracket closely fits and conforms to the curvature of the upwardly bowed portion 4 of the spring, thereby closely fitting the spring in a manner whereby play will not develop and at the same time placing the weight of the dump body on the spring centrally thereof and in a relatively low position where the truck will not be top heavy.

The forward end 17 of the truck body 11 rests and is supported on a U-shaped bracket 18. The bracket 18 is formed from angularly shaped members 19, which members have their arms 20 vertically disposed and engaging the outer sides of the side rails 2 of the chassis. The arms 20 at their lower ends terminate in inwardly extending arms 21 which engage under the rails 2 and their upper ends bent upon themselves to form upwardly and outwardly extending members 22 for engaging the opposite sides of the body 11 for preventing transverse movement of the forward end of the body, thereby preventing a twisting strain on the rear spring 3 of the vehicle. Extending inwardly from the upper ends of the arms 20 are horizontally disposed members 23, which members are secured by means of bolts 24 to the horizontal portion 25 of a second U-shaped member, which U-shaped member has its arms 26 secured by means of bolts 27 to the arms 20 of the angular shaped members 19, thereby bracing said members and at the same time forms a connection between the member 19. Arms 26 at their lower ends terminate in inwardly extending arms 28 which engage the upper sides of the bars 2 of the chassis and are provided with bolts 29 whereby the arms 21 and 28 may be forced into close and binding engagement with the upper and lower sides of the rails 2, thereby securely clamping the bracket on the chassis. By providing the separable bracket as shown, it is obvious that the brackets may be easily and quickly placed on a conventional form of chassis by simply loosening the bolts 24 and 27, which will allow the member 18 to be placed in position under the forward end of the dump body 11, after which the angularly shaped members 19 may be placed in position and secured to the member 18 by means of the bolts 24 and 27 and to the side rails 2 of the chassis by means of the bolts 29.

From the above it will be seen that dump body brackets are provided whereby a dump body may be easily and quickly attached to a chassis, without modifying the construction thereof, that lateral movement of the dump body is prevented and the rear end of the dump body is pivotally connected to a transversely disposed bracket, which last named bracket is centrally connected at a central point to the rear spring, thereby distributing the load centrally on the spring and vehicle.

Referring to Figure 5 wherein a modified form of rear bracket is shown, the construction is substantially the same with the exception that the ends of the bracket are provided with U-shaped downwardly extending brackets for receiving the rails 2 of the chassis. This form is particularly adapted for use in connection with vehicles which do not have the rear spring construction as shown in the drawing.

The invention having been set forth what is claimed as new and useful is:—

The combination with the side rails of an automobile frame, the free end of a pivoted dump body carried thereby, of a bracket for receiving and supporting the free end of the dump body, said bracket comprising horizontally disposed U-shaped members having upper and lower arms, the lower arms of the U-shaped members underlying the rails of the frame, the upper arms extending inwardly towards each other above the rails and spaced therefrom, the upper outer corners of the U-shaped members being bent to form upwardly extending dump body engaging lugs, an inverted U-shaped member having its transverse portion secured to the upper arms of the first mentioned U-shaped members, the downwardly extending arms of the inverted U-shaped member being secured to the vertical arms of the first mentioned U-shaped members, said arms of the inverted U-shaped member terminating in horizontally disposed arms engaging the upper sides of the rails and bolts extending through the lower arms of the first mentioned U-shaped members and the last mentioned horizontally disposed arms of the inverted U-shaped member.

In testimony whereof we have signed our names to this specification in the presence of two subscribing witnesses.

JOSEPH S. RASNICK.
ROBERT A. BUTTERY.
EWDARD L. LUSK.

Witnesses:
R. W. HURD,
R. L. SMYTHE.